May 7, 1968 R. V. SHIELDS 3,381,864
CLOTHES DRYING APPARATUS
Filed March 22, 1965 5 Sheets-Sheet 1
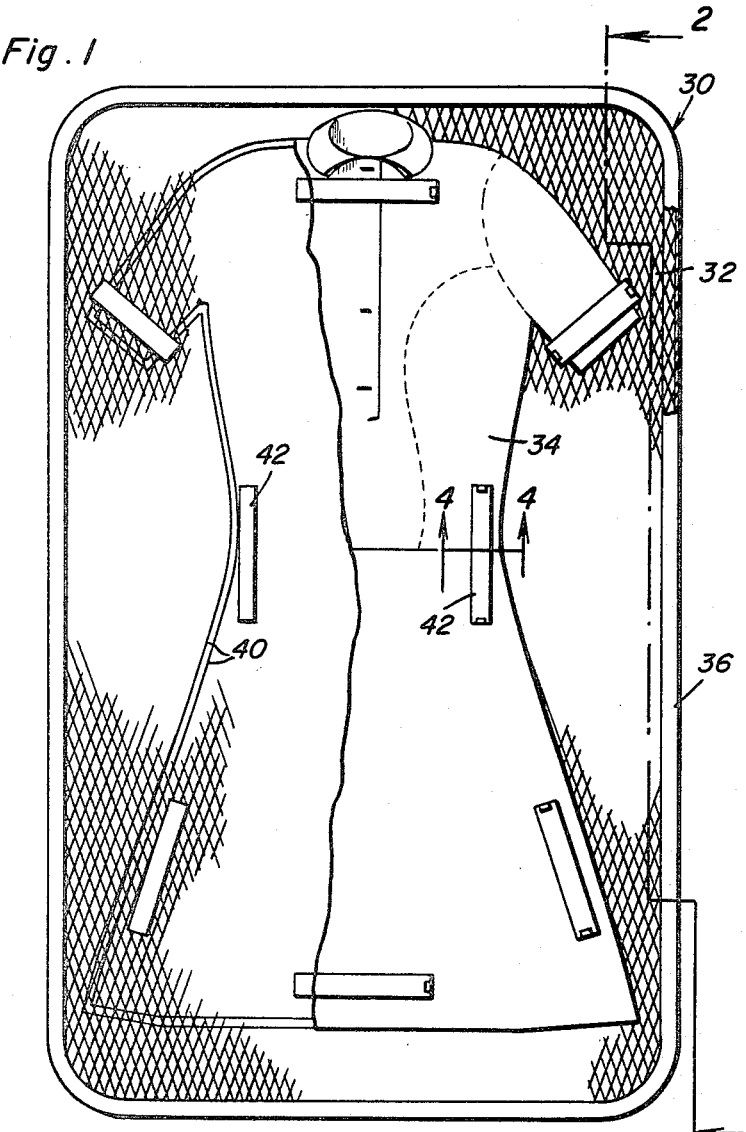
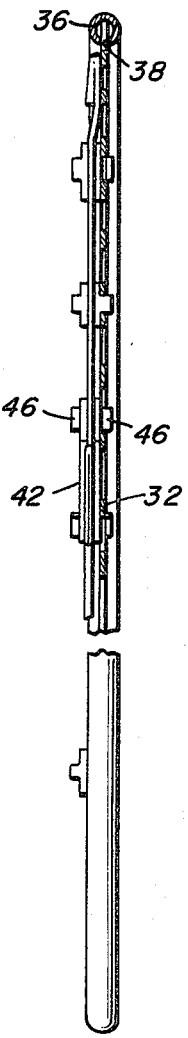
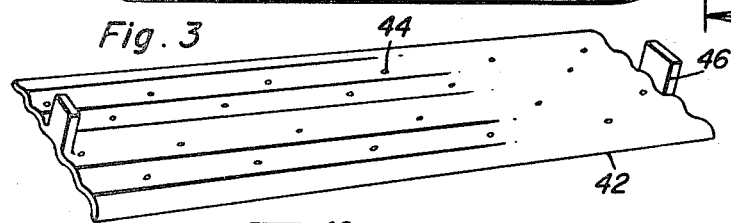
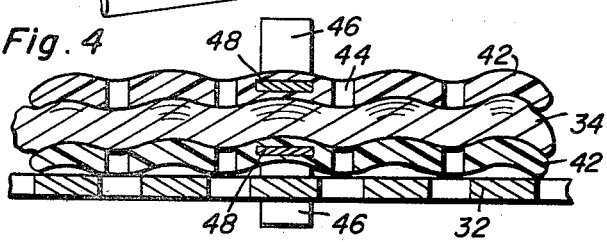
Rhea V. Shields
INVENTOR.

May 7, 1968  R. V. SHIELDS  3,381,864
CLOTHES DRYING APPARATUS
Filed March 22, 1965  5 Sheets-Sheet 2
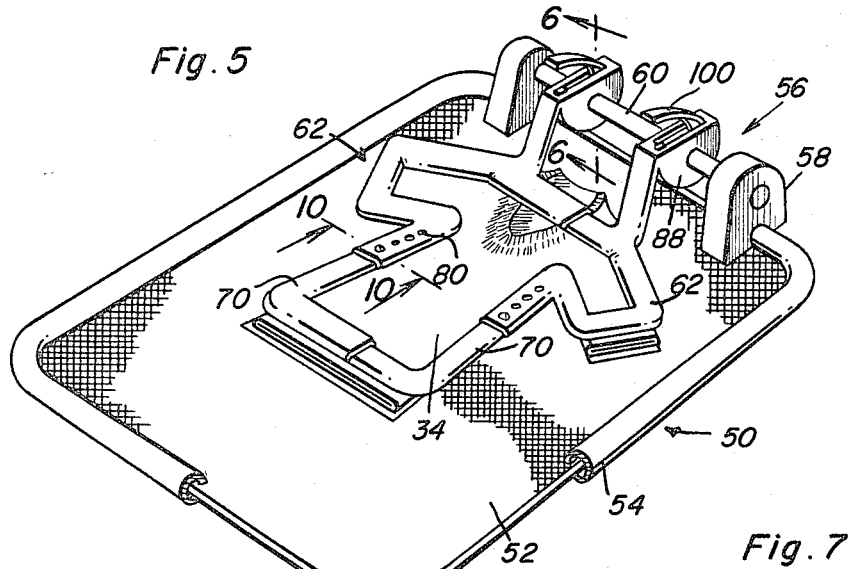
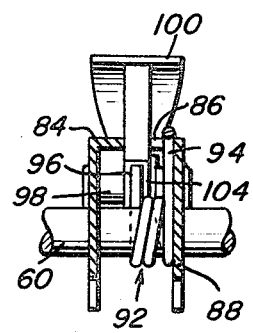
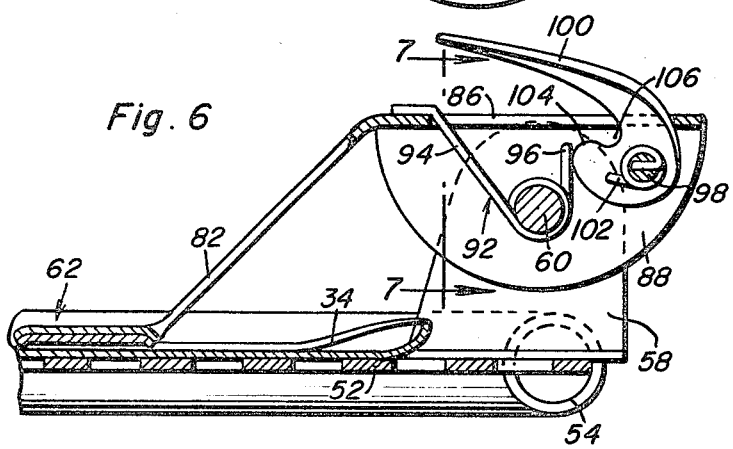
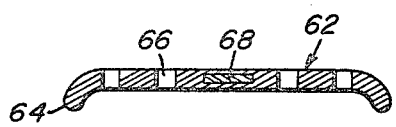
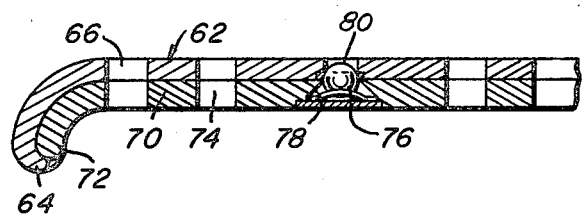
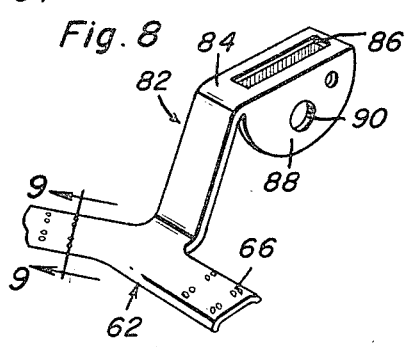
Rhea V. Shields
INVENTOR.

May 7, 1968     R. V. SHIELDS     3,381,864
CLOTHES DRYING APPARATUS
Filed March 22, 1965     5 Sheets-Sheet 3
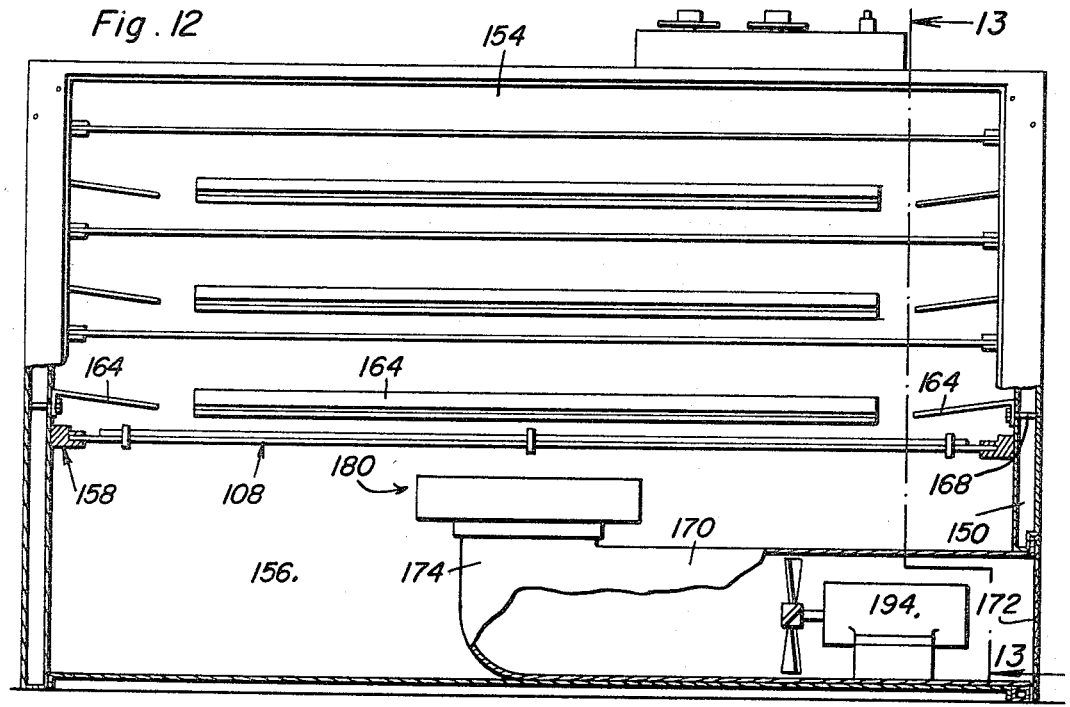
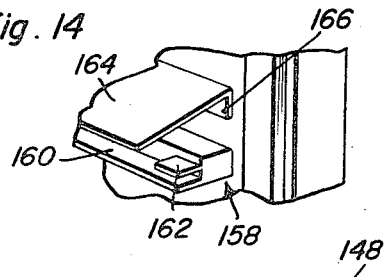
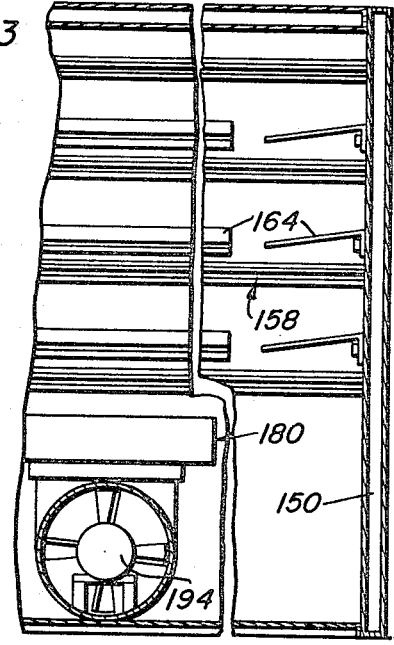
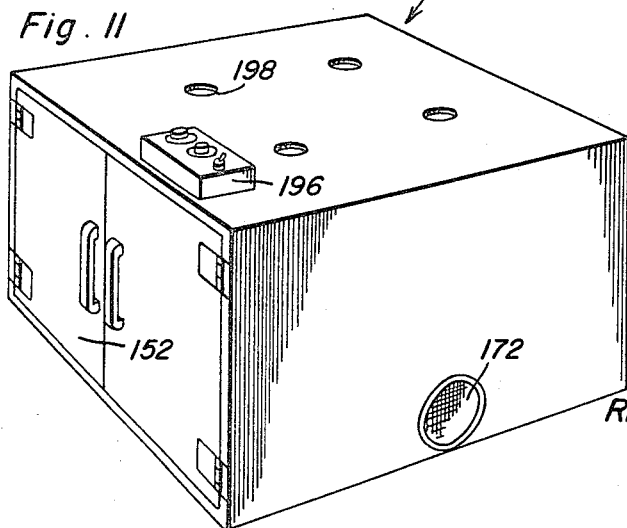
Rhea V. Shields INVENTOR.
BY *Clarence A. O'Brien*
and *Harvey B. Jackson*
Attorneys May 7, 1968  R. V. SHIELDS  3,381,864
CLOTHES DRYING APPARATUS
Filed March 22, 1965  5 Sheets-Sheet 4
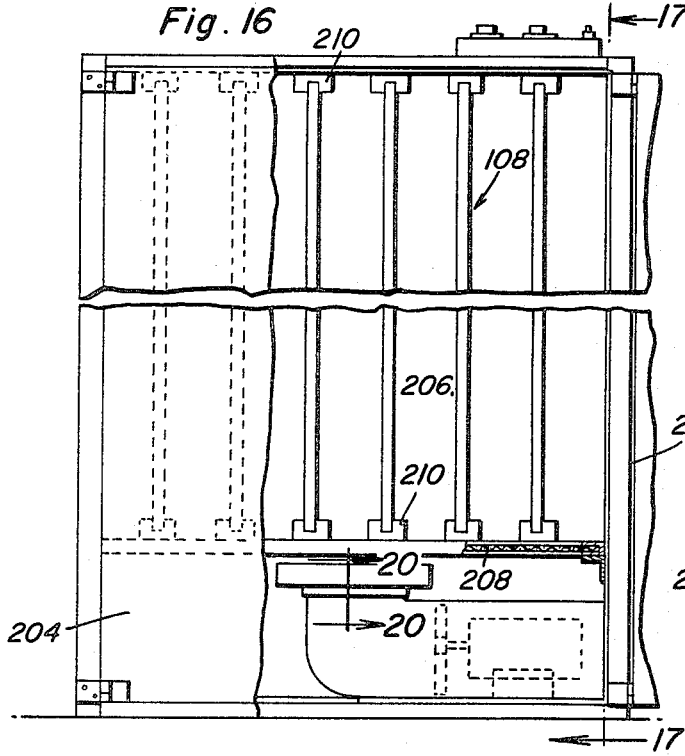
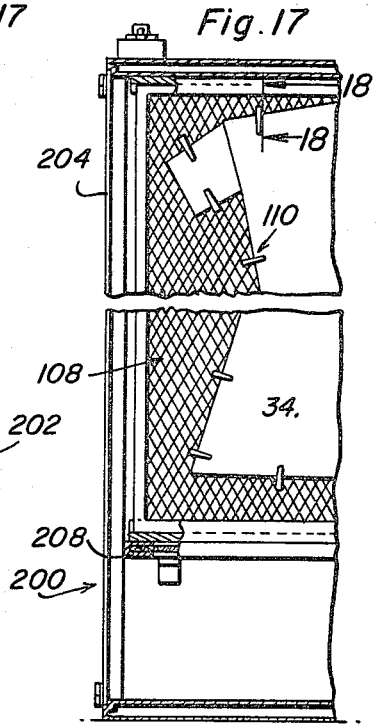
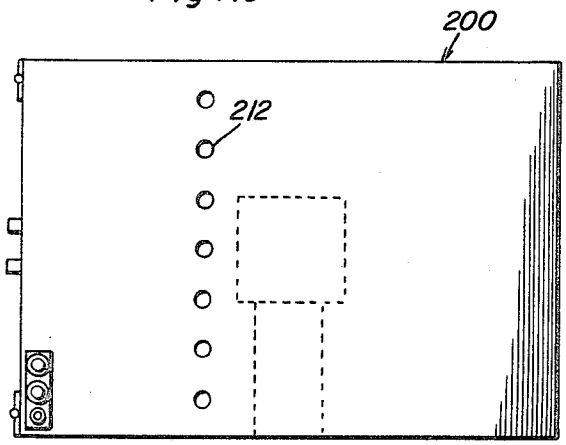
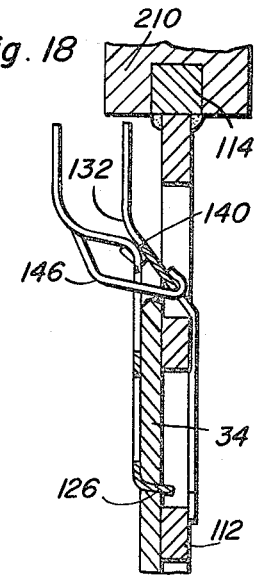
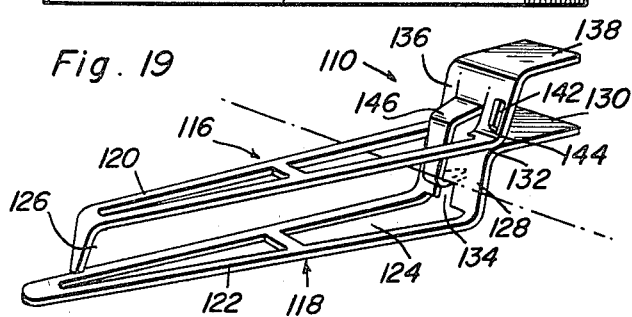
Rhea V. Shields
INVENTOR.
BY *Clarence A. O'Brien*
*and Harvey B. Jacobson*
Attorneys May 7, 1968   R. V. SHIELDS   3,381,864
CLOTHES DRYING APPARATUS
Filed March 22, 1965   5 Sheets-Sheet 5
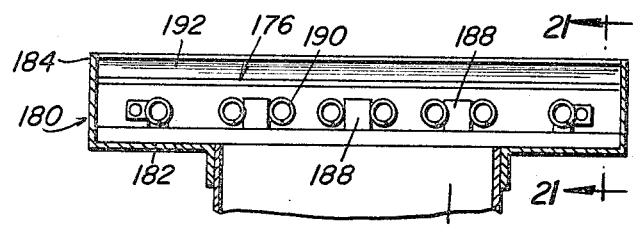
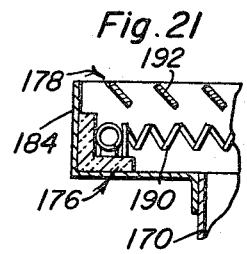
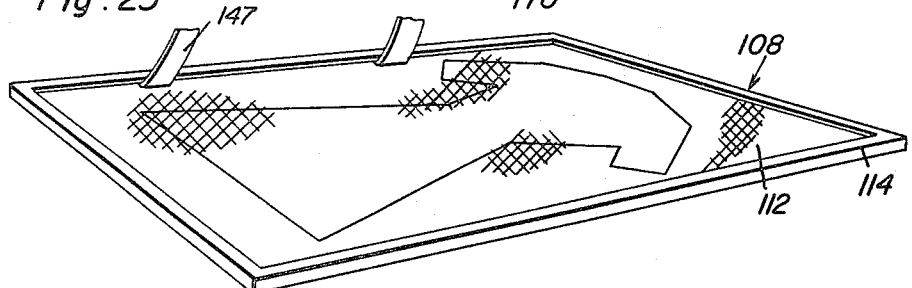
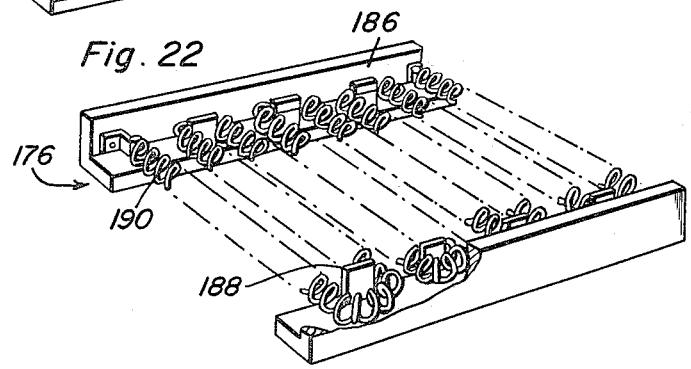
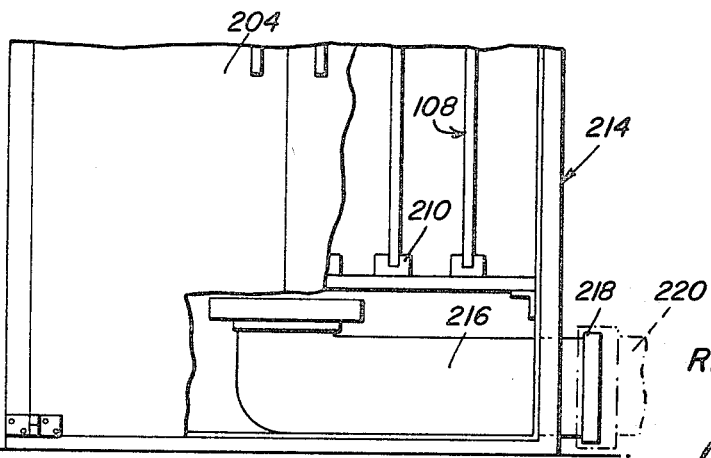
Rhea V. Shields
INVENTOR.

United States Patent Office 3,381,864
Patented May 7, 1968

3,381,864
CLOTHES DRYING APPARATUS
Rhea V. Shields, Macomb, Ill.
(155 N. Gardner St., Scottsburg, Ind. 47170)
Filed Mar. 22, 1965, Ser. No. 441,717
11 Claims. (Cl. 223—69)

ABSTRACT OF THE DISCLOSURE

Apparatus for drying clothes in conjunction with a sizing and shaping of the garment or garments involved. The apparatus includes a foraminous drying rack upon which a garment is positioned, in conjunction with keepers for engaging and securing the garment to the rack, which keepers engage the garment about the periphery thereof in a manner so as to retain the shape and size of the garment during the drying process. The keepers can be in the nature of cooperating magnetic elements, individual clips, or spring-biased garment clamping arms. A drying cabinet is provided for the reception of one or more racks with the cabinet incorporating an internal arrangement whereby a free flow of air through the racks and the retained garments is achieved.

---

The present invention relates to new and useful improvements in clothes drying apparatus.

It is a primary object of the instant invention to provide clothes mounting racks upon which individual garments can be properly sized and shaped and subjected to either natural or artificial air currents so as to effect a drying thereof.

In conjunction with the above object, it is also one of the primary objects of the instant invention to provide a simplified drying cabinet wherein rack mounted clothes can be subjected to a forced flow of heated air so as to effect the desired drying thereof.

Likewise, in conjunction with the drying racks, it is a significant object of the instant invention to provide keeper means for securing the garments to the racks without inhibiting the flow of air therethrough.

In conjunction with the above object, it is a further object of the instant invention to provide, in one embodiment, elongated spring biased holddown arms approximating the shape of the garment to be mounted and peripherally engaging the entire garment, these arms being adjustable within a limited range so as to accommodate varying sizes of a particular type of garment.

In conjunction with the drying cabinets, it is also a significant object of the instant invention to provide cabinets which are capable of accommodating a plurality of drying racks within the flow path of the heated air.

Further, it is an object of the instant invention to provide drying cabinets which can incorporate a self-contained forced warm air source, or can be supplied from any conventional extrinsic source of heated air.

In addition, it is a significant object of the instant invention to provide clothes drying apparatus which is particularly adapted for use in the drying, shaping and finishing of knitted and similar garments, substantially reducing the normally encountered problems of shrinkage, stretching and prolonged drying time.

In conjunction with the above object, a significant feature of the individual drying racks is the provision thereon of size defining outlines on one or both faces thereof corresponding in shape to a predetermined type of garment and in size to a predetermined size of said type of garment. By the same token, a plurality of such outlines, of different sizes, can be provided concentrically on one face of the racks.

Furthermore, it is an object of the instant invention to provide for clothes drying apparatus which is structurally simple and adapted for either home or commercial use, with the operation of the apparatus, and in particular the drying cabinets, requiring little skill to obtain what might be considered professional results.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of one of the drying racks of the instant invention having a partially broken away garment mounted thereon;

FIGURE 2 is a side view of the rack taken substantially on a plane passing along line 2—2 in FIGURE 1;

FIGURE 3 is a perspective view of one of the garment mounting keepers utilized in conjunction with the drying racks;

FIGURE 4 is an enlarged cross sectional view taken substantially on a plane passing along line 4—4 in FIGURE 1 and illustrating the cooperative relationship between the two keepers of each pair of keepers in mounting a garment on the rack;

FIGURE 5 is a perspective view of a drying rack having a modified form of garment mounting means thereon;

FIGURE 6 is an enlarged cross sectional view taken substantially on a plane passing along line 6—6 in FIGURE 5 detailing the biasing construction of the garment mounting arms;

FIGURE 7 is a partial cross sectional view taken substantially on a plane passing along line 7—7 in FIGURE 6;

FIGURE 8 is a partial perspective view of a portion of one of the garment mounting arms;

FIGURE 9 is an enlarged cross sectional view taken substantially on a plane passing along line 9—9 in FIGURE 8;

FIGURE 10 is an enlarged partial cross sectional view taken substantially on a plane passing along line 10—10 in FIGURE 5 and illustrating one manner of achieving an extension of these arms so as to accommodate different size garments;

FIGURE 11 is a perspective view of a drying cabinet specifically constructed so as to accommodate one of the drying racks of the instant invention;

FIGURE 12 is an enlarged cross sectional elevation through the cabinet;

FIGURE 13 is a partial transverse cross sectional view taken substantially on a plane passing along line 13—13 in FIGURE 12;

FIGURE 14 is a partial perspective view detailing a portion of the rack guide and air deflector of the drying cabinet;

FIGURE 15 is a top plan view of a modified form of drying cabinet particularly adapted for accommodating vertically orientated drying racks;

FIGURE 16 is a front elevational view of the modified form of drying cabinet with portions broken away for purposes of illustration;

FIGURE 17 is a partial cross sectional view taken substantially on a plane passing along line 17—17 in FIGURE 16;

FIGURE 18 is an enlarged partial cross sectional view taken substantially on a plane passing along line 18—18 in FIGURE 17 and illustrating both the manner in which the rack is slidably received within the cabinet guides provided therefor, and a modified form of garment mounting clip or keeper means;

FIGURE 19 is a perspective view of the garment clip illustrated in FIGURE 18;

FIGURE 20 is an enlarged cross sectional view taken substantially on a plane passing along line 20—20 in FIGURE 16 and illustrating the heating coils and baffle plate on the outlet end of the air duct leading into the rack chamber of the cabinet;

FIGURE 21 is a partial cross sectional view taken substantially on a plane passing along line 21—21 in FIGURE 20;

FIGURE 22 is a perspective view, with portions broken away, of the heating coil unit;

FIGURE 23 illustrates a modified form of closed drying rack particularly adapted for use in conjunction with the drying cabinets; and FIGURE 24 is a partial elevational view, with portions broken away, of a drying cabinet adapted for use in conjunction with an external source of forced heated air.

Referring now more specifically to the drawings, and in particular FIGURES 1–4, reference numeral 30 is used to designate one of the drying racks comprising the instant invention. The rack 30 consists of an enlarged substantially rectangular panel 32 having a plurality of perforations or air passages extending completely therethrough from one flat face to the other throughout substantially the entire area thereof thereby resulting in what might be considered a foraminous panel. This panel possesses a degree of rigidity so as to be substantially self-sustaining in nature with at least one garment 34 mounted thereon. As far as the actual material of the panel 32, this can be of any suitable material such as a slit and expanded aluminum sheet, or other type of metal, plastic coated if needed.

In order to further rigidity the panel 32 and facilitate the handling thereof, an endless beadlike edging 36 can be provided peripherally thereabout. This edging 36 is preferably to be in nature of a tubular plastic or heat resistant rubber member having a longitudinal slit 38 along the full length thereof so as to allow the member or beading 36 to be sprung about the edges of the panel 32 for effecting a frictional gripping of these edges.

In addition, the rack 30 is to include, on one or both faces or surfaces of the panel 32, garment sizing means in the form of one or more area defining outlines indicated by reference numeral 40. Each of these outlines 40, which may be painted or otherwise applied to the surface of the panel 32, approximates the shape of a particular garment as well as a predetermined size for this garment. As suggested in FIGURE 1, a plurality of concentrically orientated outlines 40 can be provided with the various outlines corresponding to different sizes for the particular garment. Further, in order to assist in distinguishing these outlines, this being particularly desirable when more than two are provided, each outline can be of a different color. Also, while it is preferred that only one type of garment be represented on one surface of the panel 32, it will of course be appreciated that, through the use of distinguishing colors, two or more different types of garments can be represented. In addition, the outlines 40 can be provided on both surfaces of the panel 32 so as to obtain the maximum adaptability possible from a single rack.

The actual mounting of the garment 34 on the rack 30 is achieved through mounting means or elements which, in the form of the invention illustrated in FIGURES 1–4, consist of pairs of keepers 42 which engage the panel 32 and sandwich the garment 34 therebetween. Each of the keepers 42 of each of the pairs consists of an elongated relatively wide member having smooth longitudinal corrugations orientated transversely thereacross, and is preferably formed of a suitable plastic material. In addition, each keeper is provided with a plurality of air flow allowing holes 44 therethrough so as to not significantly interfere with the movement of air through the panel 32. The substantial width of the keepers 42 is particularly desirable so as to avoid any undesirable embossing of, for example, wet knitted fabric, the actual grip on the fabric of the garment 34 being achieved in a gentle manner through the smooth corrugations. Each of the keepers 42 includes, at each end thereof, along the longitudinal centerline, an outwardly projecting gripping lug 46 of a size so as to be received through a panel aperture so as to prevent a lateral shifting of the keeper 42 relative to the panel 32. With particular reference to FIGURE 4, it will be noted, that in utilizing the keepers 42 in pairs, a first or lower keeper 42 is inverted and laid directly on the panel 32 with the lugs 46 projecting through a pair of spaced apertures or foramina therein, thereby fixing the position of this lower keeper 42 on the panel 32, this of course being done adjacent and just within the particular outline 40 which corresponds to the garment to be mounted. Next, the garment 34 is positioned on the panel 32 and the appropriate portion thereof is laid over the lower keeper 42 after which the upper keeper 42, with the lugs 46 being directed upwardly so as to facilitate the handling of the keeper 42, being positioned over the garment 34 and directly above the lower keeper 42 so as to sandwich the garment 34 therebetween. In order to secure the upper keeper 42 in garment retaining position, it is contemplated that each of the keepers 42 be provided with elongated permanent magnet inserts 48 embedded therein. The magnetic attraction between these inserts 48 is to of course be sufficient, especially in conjunction with the longitudinal corrugations, so as to securely grip the edge of the garment 34 against any tendency of shrinkage occurring during the drying process. Incidently, if so desired, the gripping tabs 46 can be of different colors so as to enable a quick indication of the opposite poles of the magnetic inserts 48. Further, it will be appreciated that the exact distance between the outwardly projecting lugs 46 is to of course correspond to the spacing between the panel apertures. Also, in those instances where the panel 32 is formed of a magnetically attractable metal, the magnetic insert 48 in the lower keeper 42 will act so as to further stabilize the lower keeper 42 relative to the panel 32.

Referring now particularly to FIGURES 5–10, it will be noted that a modified form of drying rack 50 has been illustrated therein. This rack 50, although including a panel 52 and edging bead 54 similar to that of rack 30, differs therefrom in the provision of an integral garment mounting or retaining unit 56. Initially, the unit 56 includes a pair of spaced upstanding light weight blocks or pedestals 58 fixed to one end of the panel 52 in spaced relation both to each other and to the adjacent longitudinal edges of the panel 52. An elongated cylindrical rod 60 extends non-rotatably between the pedestals 58 and has its opposite ends fixed therein in a manner so as to orientate the rod 60 parallel to and in spaced relation above the corresponding edge of the panel 52. A pair of elongated holddown arms 62 are provided so as to directly overlie at least the upper portion of a mounted garment 34 with each arm 62, as will be appreciated from FIGURE 5, having a shape which generally corresponds to the outline of at least one-half of the edge of the upper portion of the garment 34. With reference to FIGURE 9, it will be noted that the arms 62 have downwardly curled smooth edges 64 which engage and softly grip the fabric of the garment 34. Furthermore, the arms 62, as were the keepers 42, are provided with air flow permitting apertures 66 therethrough, in addition to a central longitudinally extending reinforcing bar 68 so as to introduce the desired degree of rigidity. Each arm 62, depending upon the particular length of the garment 34, can have an extension 70 associated therewith. These extensions 70, as will be best appreciated from FIGURE 10, are of a width slightly less than the width of the corresponding arms 62 so as to allow for a nesting therein. Further, when such extensions 70 are provided, the downwardly turned edges 64 of the arms 62 are preferably slightly curled under the similarly down-turned edges 72 of the extensions 70 so as to confine the extensions within their corresponding arms 62 for movement solely in a longitudinal direction. Incidently, the extensions 70 also have the air flow permitting apertures 74 therein. The degree of projection of each extension 70 from its corresponding arm 62 is to be variable with the relationship therebetween being fixed in a plurality of predetermined adjusted positions in any desirable manner. One preferred manner of providing for this fixing of the extension 70 relative to its arm 62 in an adjusted position is by means of a leaf spring biased ball 76 mounted within an upwardly opening socket 78 in the extension 70 with the ball 76 being biased partially upward through the open upper end of the socket 78, which incidently is of course slightly less than the diameter of the ball 76 so as to not allow for a complete projection of the ball 76 therefrom, into one of a series of aligned holes 80 in the corresponding arm 62. For effecting the adjustment, one need merely engage and depress the ball 76 through the hole 80 within which it is located and shift the extension 70 until the ball 76 aligns with a subsequent hole 80 at which time the leaf spring automatically projects the ball 76 into locking engagement. In those situations wherein either or both the arms 62 and extensions 70 have portions thereof which extend laterally inward toward each other so as to engage over the upper and lower edges of the mounted garment 34, these inwardly extending portions overlap with the lower portions nesting within the upper portions as best seen in FIGURE 5. This overlap is of particular significance in that it allows, in the same manner as the extensions, an adjustment of the holddown unit 56 so as to accommodate different size garments 34.

The actual mounting of the arms 62 on the elongated fixed rod 60 is achieved, in each instance, through the provision of a laterally projecting upwardly offset bar 82 terminating in a horizontally extending flat portion 84 having an elongated central control lever slot 86 therethrough and a pair of depending ears 88 integral with the longitudinal edges thereof. The parallel depending ears 88 include centrally located apertures 90 which rotatably receive the rod 60 so as to pivotally mount the corresponding arm 62 on the rod 60.

Located between the depending ears 88 of each of the arms 62 is an elongated springlike member or wire 92 having the central portion thereof coiled about the rod 60 with the forward terminal end 94 thereof projecting diagonally upward through the forward portion of the slot 86 and into engagement with the front portion 84 just forward of the slot 86 so as to tend to bias the arm 62 downwardly against the upper surface of the panel 52. The opposite end 96 of the spring member 92 projects substantially verticaly on a tangent from the rear of the rod 60. Mounted between the ears 88 rearward of the rod 60, on a transversely extending fixed shaft 98, is an elongated control lever 100 which projects outwardly through the slot 86 and in a general forward direction. The inner end of the lever 100, which is biased in a rearward rotational direction by a coiled spring member 102 having the opposite ends thereof engaged with the shaft 98 and the lever 100, is in the nature of an enlarged cam having a forwardly projecting lobe 104 thereon. This lobe 104 engages against the generally vertically projecting rear end 96 of the spring 92 when the lever or handle 100 is biased upwardly through its biasing spring 102. In this position, the spring 92, through a forward biasing of the end 96, exerts a substantial downward biasing on the corresponding arm 62, and at the same time, through the coiled nature of the spring 92, tends to exert a frictional grip on the rod 60 so as to avoid any lateral shifting of the arm along the rod 60. In order to release the arm 62, the lever 100 is depressed against the biasing force of its spring 102 with the lobe 100 moving downwardly and allowing a rearward movement of the rear end 96 of the spring 92 into an accommodating recess 106 provided immediately above the cam lobe 104. With the lever 100 depressed, the arm 62 can now be easily raised away from the garment and laterally adjusted on the rod 60. Immediately upon release of the lever 100, the lever 100 is biased upwardly by the spring 102 and the lobe engages and pushes against the end 96 of the spring 92 so as to increase the grip on the rod 60 and simultaneously increase the force tending to downwardly bias the corresponding arm 62 against the surface of the panel 52. It should of course be appreciated that while the above description is directed toward a specific manner of effecting the downward clamping bias of the arms 62, the instant invention also contemplates the utilization of other equivalent means within the scope of the claimed invention.

As noted in the objects supra, the instant invention, in addition to being directed to the above described racks, also contemplate the provision of drying cabinets specifically adapted to receive these racks and subject the garments thereon to conditioned air. While these cabinets, depending upon the rack guides or guide channels therein, can easily accommodate racks 30 or 50, these cabinets have been illustrated in combination with yet another form of rack generally referred to by reference numeral 108 which in turn is illustrated in conjunction with a third type of mounting member or keeper means 110.

Referring specifically to the drying rack 108, it will be noted that the elongated substantially rectangular panel 112 therein is foraminous or includes the holes therethrough substantially in the same manner as the previously discussed panels 32 and 52. The rack 108, however, differs from the previous racks in that the reinforcing bead 114 about the periphery thereof is rectangular in cross section and of a material capable of being bonded directly to the peripheral edges of the panel 112. For example, the edging 114 can be constructed of metal and welded directly to the edges of the panel 112 as suggested in FIGURE 18. The modified keeper means or mountnig clip 110 includes upper and lower jaws 116 and 118 interconnected at the rear ends thereof in a manner so as to spring bias the forward gripping ends together. Both of the jaws 116 and 118 have elongated longitudinally tapered bodies 120 and 122, with both bodies having air passing slots 124 therein. The upper jaw 116 terminates, at the forward end of the body portion 120, in a laterally bent gripping tip 126 which is adapted to engage through the fabric of the garment 34 in the manner illustrated in FIGURE 18. Whether or not this piercing tip 126 is of a length so as to actually engage through the slotted lower jaw body 122, after projecting through the garment 34, is a matter of choice depending upon how long this tip 126 is. The rear end of the lower jaw body 122 is offset upwardly therefrom so as to form a first inclined portion 128 and a second horizontal portion 130 defining an upwardly directed camming shoulder 132 therebetween. In addition, a centrally located upwardly extending notch 134 is provided in the inclined portion 128. The upper jaw body 120, at the rear end thereof, is also upwardly offset and includes a first angularly extending portion 136 and a second horizontally extending gripping portion 138. In regard to the upper jaw 116, the camming shoulder 140 is provided between the body 120 and the upwardly angled portion 136, this camming shoulder 140 engaging against the lower shoulder 132. In addition, the rear section of the lower jaw 118 includes a pair of resilient lugs 142 bent upwardly from the inclined portion 128 and engaged with the forward face of the upper inclined portion 136 through a pair of laterally spaced apertures 144. The actual biasing of the upper jaw 116 toward the lower jaw 118 is achieved through an arcuate centrally located resilient section 146 bent outwardly from the upper jaw 116 and hooked through the notch 134 for engagement with the rear surface of the angled portion 128 of the lower jaw 118 as will be appreciated from FIGURES 18 and 19. Due to the spring bias in this member 146, the jaw 116 is biased downwardly toward the jaw 118 about the abutting camming shoulders 132 and 140. When the mounting clip 110 is to be applied, the horizontal portions 130 and 138 are gripped between the fingers and compressed so as to move the jaws 116 and 118 apart. After this, the lower jaw 118 is introduced through one of the panel apertures adjacent the periphery of the garment 34, and the clip 110 is moved inwardly so as to position the jaw 116 over the garment edge, after which the grip on the portions 130 and 138 is released so as to allow the resiliency of the portion 146 to bring the piercing point 126 through the material of the garment 34, thereby locking the garment 34 to the panel 112. While the particular keeper means 110 has been illustrated with one form of the drying rack, it will of course be appreciated that the keeper means and drying racks are interchangeable. Incidently, referring to FIGURE 23, the instant invention also contemplates the provision of additional holddown means in the form of elongated elastic straps 147 affixed to one edge of a drying rack and stretchable across a garment on the rack into releasable locking engagement with the rack adjacent the opposite edge thereof in any suitable manner such as through small hooks engaged within the panel apertures.

Referring now to FIGURES 11–14, it will be noted that one form of drying cabinet 148 has been illustrated therein. This cabinet 148, generally rectangular in shape and including insulated walls 150, is provided with double doors 152 selectively closing one complete end of the cabinet 148, thereby allowing straight access to the entire interior of the cabinet 148. The interior of the cabinet 148 is arranged into an upper rack receiving chamber or compartment 154 and a lower machine compartment 156. The rack receiving compartment includes vertically spaced pairs of elongated guides 158, with the guides 158 of each pair being secured to the opposite walls 150 in lateral alignment with each other and project rearwardly from the doors 152 to the opposite end of the cabinet 148. Incidently, this opposite end of the cabinet 148 may, if so desired, also be provided with doors 152 so as to allow access to the cabinet from either side thereof. As will be appreciated from FIGURE 14, the guides 158 include an inwardly projecting full length bottom flange 160 in conjunction with an upper holddown flange 162 which may be either continuous or discontinuous as illustrated. The drying rack, this being rack 112 in the illustrated embodiment, is supported between the guides 158 of each pair of guides by engaging the reinforcing bead 114 thereof on the lower supporting flange 160 of each guide 158 through the open doors 152 and then pushing the rack 112 into the cabinet. As will be appreciated from the drawings, it is contemplated that the cabinet 148 be of a size so as to accommodate a plurality of similarly supported racks orientated horizontally thereacross. In addition, inwardly directed and downwardly inclined air baffles 164 are secured to the walls 150 of the cabinet 148 peripherally thereabout and in spaced relation above the guides 158 through vertically extending mounting flanges 166 through which bolts 168 are extended. These baffles 164 project inwardly a substantial distance beyond the guides 158, at least insofar as the side walls are concerned, so as to tend to reverse the flow of upwardly directed air and produce a slight turbulence therein so as to insure a maximum utilization of the heated air as it flows through the cabinet 148. Incidently, it will be noted that a heat baffle 164 is also provided along the rear wall of the cabinet 148 opposite from the doors 152, assuming of course that a second pair of doors 152 are not provided.

The forced warm air is directed through the garment mounting racks 108 by means of an air duct 170 projecting inwardly from a vented opening 172 in one wall of the cabinet 148 and terminating, centrally within the cabinet 148, in an upwardly directed end 174 upon which is mounted a suitably controlled heating element unit 176 and a superimposed air deflecting baffle unit 178. The discharge end 174 of the air duct 170, in order to accommodate the heating coil unit 176 and the baffle unit 178, has an outwardly enlarged unit 180 thereon which includes a flat platform portion 182 and an upstanding peripheral flange portion 184. The heating coil unit 176 consists basically of a pair of elongated laterally spaced angular bars 186 of a suitable non-conductive material. These bars 186 have, on the inwardly directed flanges thereof, upwardly projecting lugs 188 around which an elongated heating coil 190 is directed, this coil 190 extending laterally between the bars 186 in parallel lengths along the width of the unit 176. The baffle unit 178 consists of a plurality of angularly directed fins 192 fixed to opposed portions of the upstanding peripheral flange 184 and projecting completely thereacross, the particular angle of these fins 192 varying in accordance with the desired direction for the air flow. The forced air to be directed through the heating unit and into the rack compartment 154 originates from a blower unit 194 located within the conduit 170 inwardly from the screened opening 172 through the cabinet wall 150. While not specifically illustrated, it will of course be appreciated that suitable conductors are provided for supplying the necessary electrical energy to both the heating coil 190 and the blower unit 194. Further, if deemed necessary, the entire unit can be thermostatically controlled and equipped with an automatic timing mechanism. As will be appreciated from FIGURE 11, the control box 196 is normally provided on the top of the cabinet 148 in the vicinity of the front or door containing wall. Finally, in order to allow an exhausting of the air, preferably after a dissipation of the major portion of the heat therein, a plurality of vent holes 198 are provided through the top of the cabinet 148.

FIGURES 15–17 illustrate a modified form of cabinet 200, including insulated walls 202 and hinge mounted double doors 204 similar to cabinet 148. However, cabinet 200 differs from cabinet 148 in that the rack containing compartment 206 is provided with a rigid mesh floor 208 dividing this compartment from the lower machinery compartment which contains the same apparatus noted supra in regard to the cabinet 148. In the cabinet 200, the racks 108 are to be orientated vertically, and as such, the guides 210 are provided both along the top of the cabinet 200 and along the mesh floor 208, these guides 210 extending from the front of the cabinet to the rear thereof for the reception of the racks 108 in the same manner as noted supra with regard to the horizontally positioned racks. The mesh compartment floor 208 of course allows for the free movement of the air therethrough into the rack compartment 206 while at the same time providing a stable supporting floor for the racks 108. Suitable vent holes 212 are also naturally provided in the cabinet 200.

Finally, the partial elevational view of FIGURE 23 illustrates a modified form of cabinet 214 wherein the air conduit 216 projects laterally beyond the wall of the cabinet 214 and includes a coupling head 218 thereon for engagement with the exhaust end 220 of an external or extrinsic source of forced warm air, such as the discharge vent of a conventional home dryer.

From the foregoing, it will be appreciated that a highly novel drying apparatus has been defined, this apparatus including, in addition to forced warm air cabinets, specifically formed drying racks upon which garments to be dried can be mounted and blocked for introduction to a flow of air.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Clothes drying apparatus comprising a rack including an enlarged flat panel of shape sustaining foraminous material, said panel having a pair of opposed flat faces with the foraminous material defining a plurality of open air passages laterally through the panel from one face to the other, a rigidifying means encircling said panel and secured to the peripheral edges thereof, garment sizing means on at least one face of said panel, said garment sizing means comprising an area defining outline on said one face substantially corresponding in shape to a particular type of garment and in size to a particular size of said type of garment, garment mounting means associated with said panel and operative to secure a garment to one face thereof, said mounting means comprising a plurality of pairs of independent keepers, a first keeper of each pair including retaining means engaged through selected ones of the air passages for a mounting of the keeper on the panel, said retaining means comprising a pair of spaced laterally projecting lugs which, upon engagement with the air passages, will prevent a lateral shifting of the keeper relative to the panel, the garment to be mounted completely overlying said first keeper, the second keeper of each pair being adapted to completely overly the first keeper with the garment sandwiched therebetween, and means for operatively and releasably interlocking said second keeper to said first keeper through said garment.

2. The structure of claim 1 wherein said last-mentioned means utilizes magnetic attraction.

3. The structure of claim 2 wherein said keepers each consist of an elongated relatively wide rigid member, said member having a plurality of apertures therethrough so as to accommodate a movement of air.

4. The structure of claim 3 wherein each member includes a plurality of longitudinally extending smooth corrugations along the full length thereof.

5. Clothes drying apparatus comprising a rack including an enlarged flat panel of shape sustaining foraminous material, said panel having a pair of opposed flat faces with the foraminous material defining a plurality of open air passages laterally through the panel from one face to the other, a rigidifying means encircling said panel and secured to the peripheral edges thereof, garment sizing means on at least one face of said panel, said garment sizing means comprising an area defining outline on said one face substantially corresponding in shape to a particular type of garment and in size to a particular size of said type of garment, garment mounting means associated with said panel and operative to secure a garment to one face thereof, said garment mounting means comprising a pair of elongated arms, said arms, in combination, substantially conforming in shape to the entire outline of a garment to be secured, each arm being pivotally mounted on said panel adjacent one edge thereof, and means biasing said arms downwardly against one face of the panel so as to continuously engage and secure a garment positioned on the panel peripherally about the edge portion of the garment.

6. The structure of claim 5 wherein said arms are laterally adjustable relative to each other.

7. The structure of claim 6 wherein each arm includes a longitudinally adjustable extension thereon.

8. The structure of claim 6 wherein each arm has downwardly curled smooth edges for direct engagement with an underlying garment, and a plurality of airflow permitting passages defined through said arms between the downwardly curled edges thereof.

9. Clothes drying apparatus comprising a rack, said rack including an enlarged flat panel of shape sustaining perforated material, said material having a pair of opposed flat faces with the perforatitons defining a plurality of open air passages laterally therethrough from one face to the other, and garment mounting means associated with said panel and operative to secure a garment to one face thereof, said garment mounting means comprising a pair of elongated arms, each arm generally conforming in shape to a substantial portion of the outline of a garment to be supported on the panel, each arm being pivotally mounted on said panel adjacent one edge thereof in a manner whereby the combined lengths and shape of said arms form substantially the complete outline of a garment, said arms being laterally adjustable relative to each other, and means biasing said arms downwardly against one face of said panel so as to sandwich a garment between the arms and the panel.

10. Clothes drying apparatus comprising a rack including an enlarged flat panel of shape sustaining foraminous material, said panel having a pair of opposed flat faces with the foraminous material defining a plurality of open air passages laterally through the panel from one face to the other, a rigidifying means encircling said panel and secured to the peripheral edges thereof, garment sizing means on at least one face of said panel, said garment sizing means comprising an area defining outline on said one face substantially corresponding in shape to a particular type of garment and in size to a particular size of said type of garment, garment mounting means associated with said panel and operative to secure a garment to one face thereof, said mounting means comprising a pair of elongated flat jaws, said jaws constituting an upper jaw and a lower jaw, said lower jaw being of a transverse width capable of passage through said panel air passages, said lower jaw having a coplanar piercing tip on the leading end thereof and an upwardly offset gripping portion on the following end thereof, said offset portion being such so as to enable a positioning of the following end of the lower jaw to one side of the panel while the remainder of the lower jaw is positioned to the opposite side of the panel, said upper jaw having the leading end portion thereof angularly bent toward the corresponding leading end of the lower jaw, the angularly bent end of the upper jaw being of a size receivable through the air passages, the following end of said upper jaw engaging the offset following end of said lower jaw whereby said upper jaw projects generally parallel to said lower jaw at a height equal to the offset following end portion of the lower jaw.

11. Clothes drying apparatus comprising a rack including an enlarged flat panel of shape sustaining foraminous material, said panel having a pair of opposed flat faces with the foraminous material defining a plurality of open air passages laterally through the panel from one face to the other, and garment mounting means associated with said panel and operative to secure a garment to one face thereof, said mounting means comprising a plurality of pairs of independent keepers, a first keeper of each pair including retaining means engaged through selected ones of the air passages for a mounting of the keeper on the panel, said retaining means comprising a pair of spaced laterally projecting lugs which, upon engagement with the air passages, will prevent a lateral shifting of the keeper relative to the panel, the garment to be mounted overlying said first keeper, the second keeper of each pair being adapted to overlie the first keeper with the garment sandwiched therebetween, and means for operatively and releasably interlocking said second keeper to said first keeper through said garment.

References Cited

UNITED STATES PATENTS

| | | | |
|---|---|---|---|
| 104,333 | 6/1870 | Mickel | 34—195 |
| 1,162,738 | 12/1915 | Ballard | 223—69 X |
| 1,779,442 | 10/1930 | Mueller | 24—248 X |
| 2,160,337 | 5/1939 | McKee | 223—69 X |
| 2,521,100 | 9/1950 | Sublette | 223—69 |
| 2,599,199 | 6/1952 | Roberts | 223—69 |
| 2,616,595 | 11/1952 | Arruda | 223—37 |
| 3,167,223 | 1/1965 | Weiss | 223—37 |
| 3,201,842 | 8/1965 | Armistead | 24—201.2 X |

JORDAN FRANKLIN, *Primary Examiner.*

G. V. LARKIN, *Examiner.*